Figure 1:
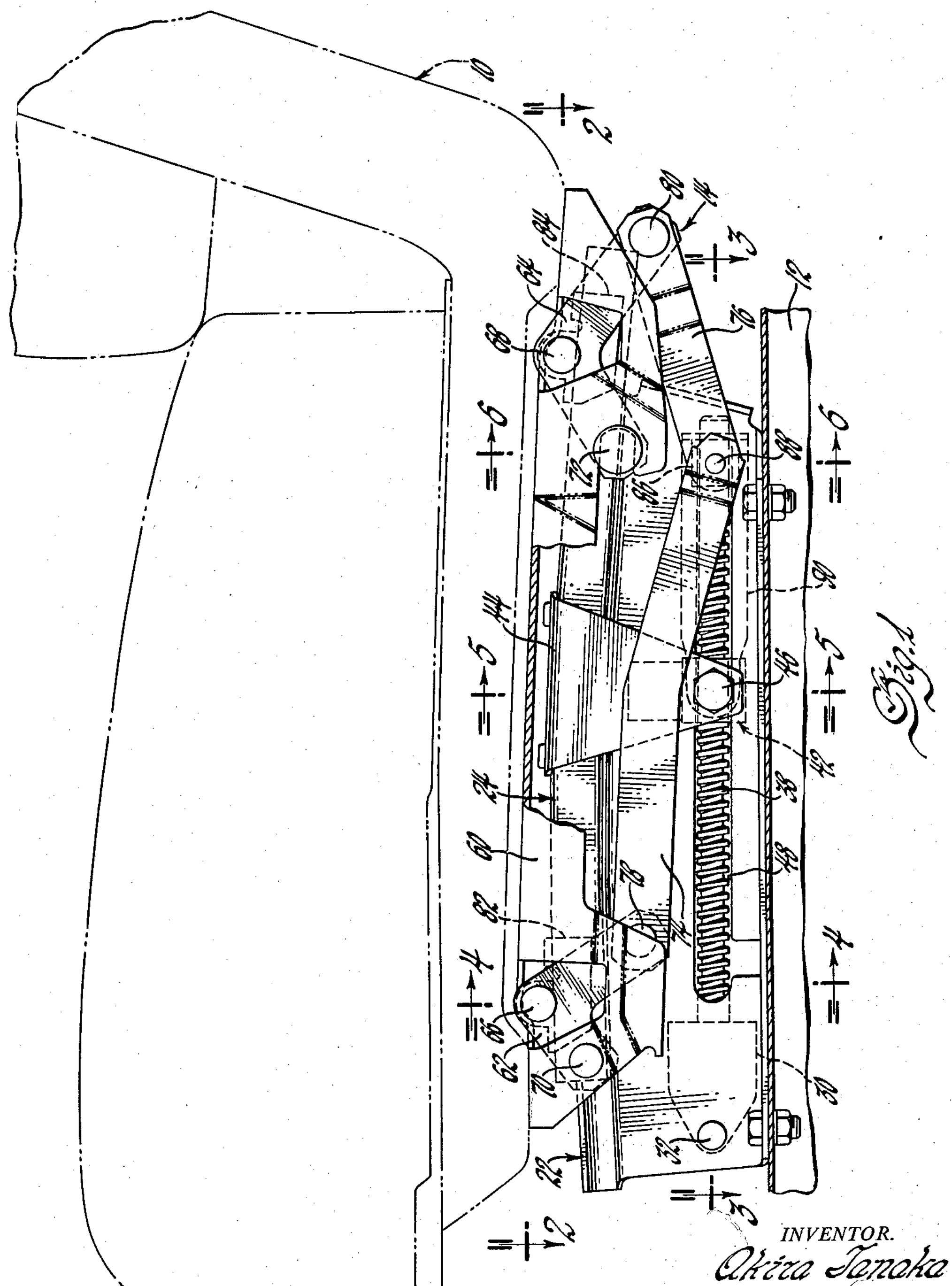

Jan. 5, 1960 A. TANAKA 2,919,744

SEAT ADJUSTER MECHANISM

Filed June 16, 1958 4 Sheets-Sheet 1

INVENTOR.
Akira Tanaka
BY
E. W. Christen
ATTORNEY

Jan. 5, 1960 A. TANAKA 2,919,744

SEAT ADJUSTER MECHANISM

Filed June 16, 1958 4 Sheets-Sheet 2

INVENTOR.
Akira Tanaka
BY E. W. Christen
ATTORNEY

Jan. 5, 1960
A. TANAKA
2,919,744
SEAT ADJUSTER MECHANISM
Filed June 16, 1958
4 Sheets-Sheet 3
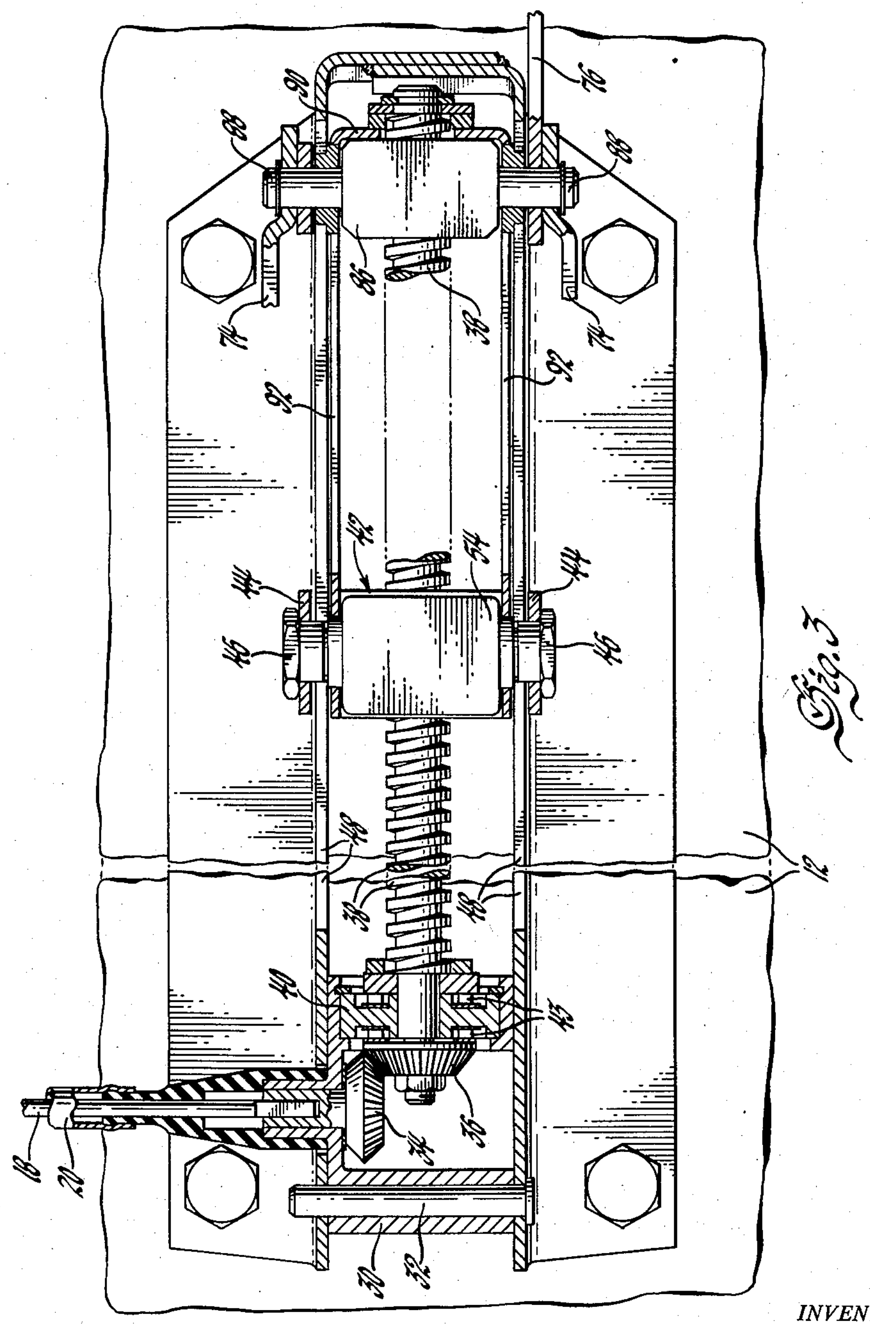
INVENTOR.
Akira Tanaka
BY
E. W. Christen
ATTORNEY Jan. 5, 1960 A. TANAKA 2,919,744
SEAT ADJUSTER MECHANISM
Filed June 16, 1958 4 Sheets-Sheet 4
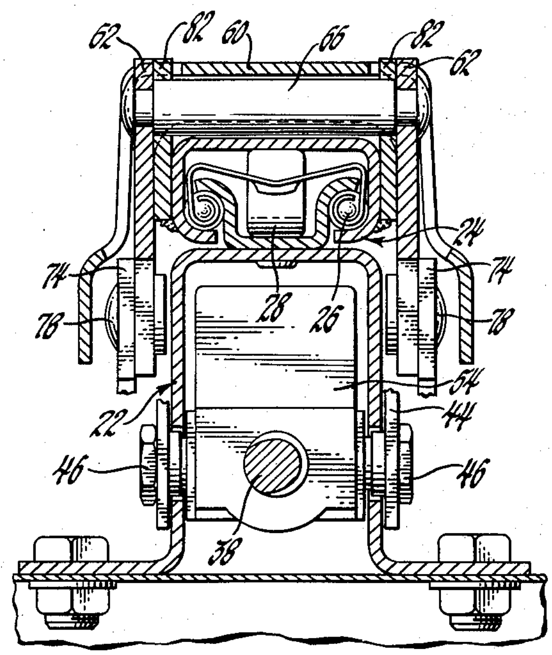
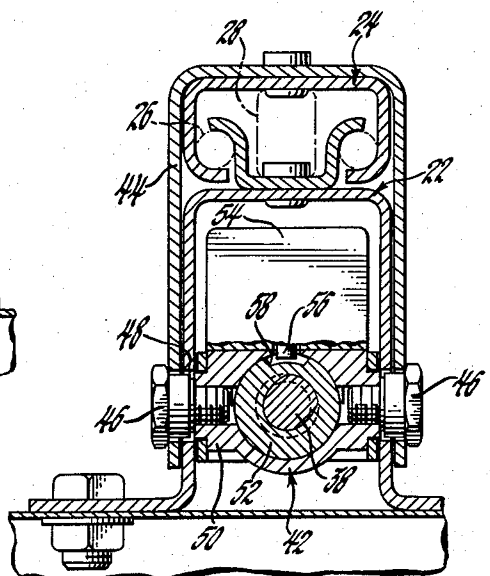
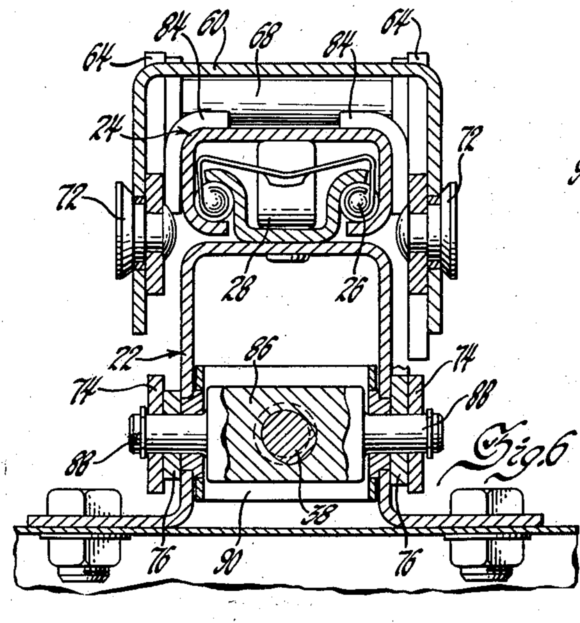
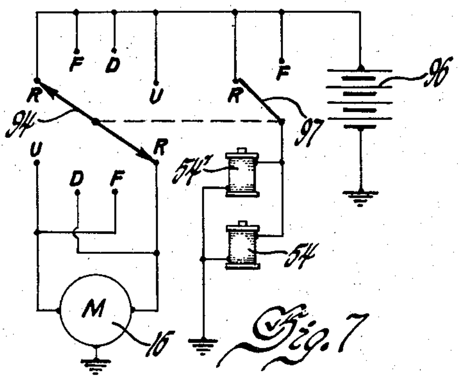
INVENTOR.
Akira Tanaka
BY
E. W. Christen
ATTORNEY 2,919,744

SEAT ADJUSTER MECHANISM

Akira Tanaka, Detroit, Mich., assignor to General Motors Corporation, Detroit, Mich., a corporation of Delaware Application June 16, 1958, Serial No. 742,335

5 Claims. (Cl. 155—14)

This invention relates to seat adjusters and more particularly to a power-operated seat adjuster that provides selective adjustment in vertical and horizontal directions.

It is desirable in a power-operated seat adjuster to be able to make independent vertical and horizontal adjustments. A known arrangement includes a jackscrew driven by a reversible motor and which carries a pair of nuts which may freewheel with the jackscrew but which may be selectively clutched against rotation therewith at will, one nut being connected to linkage that effects horizontal movement and the other nut being connected to linkage that effects vertical movement. Such clutch nuts are expensive and the present invention provides an arrangement wherein an ordinary nut is substituted for the vertical clutch nut and the seat adjuster structure is so arranged that vertical adjustment can not take place when the horizontal clutch nut is engaged. The invention thus provides a more economical seat adjuster.

Further objects and advantages of the present invention will be apparent from the following description, reference being had to the accompanying drawings, wherein a preferred form of the present invention is clearly shown.

Figure 2:
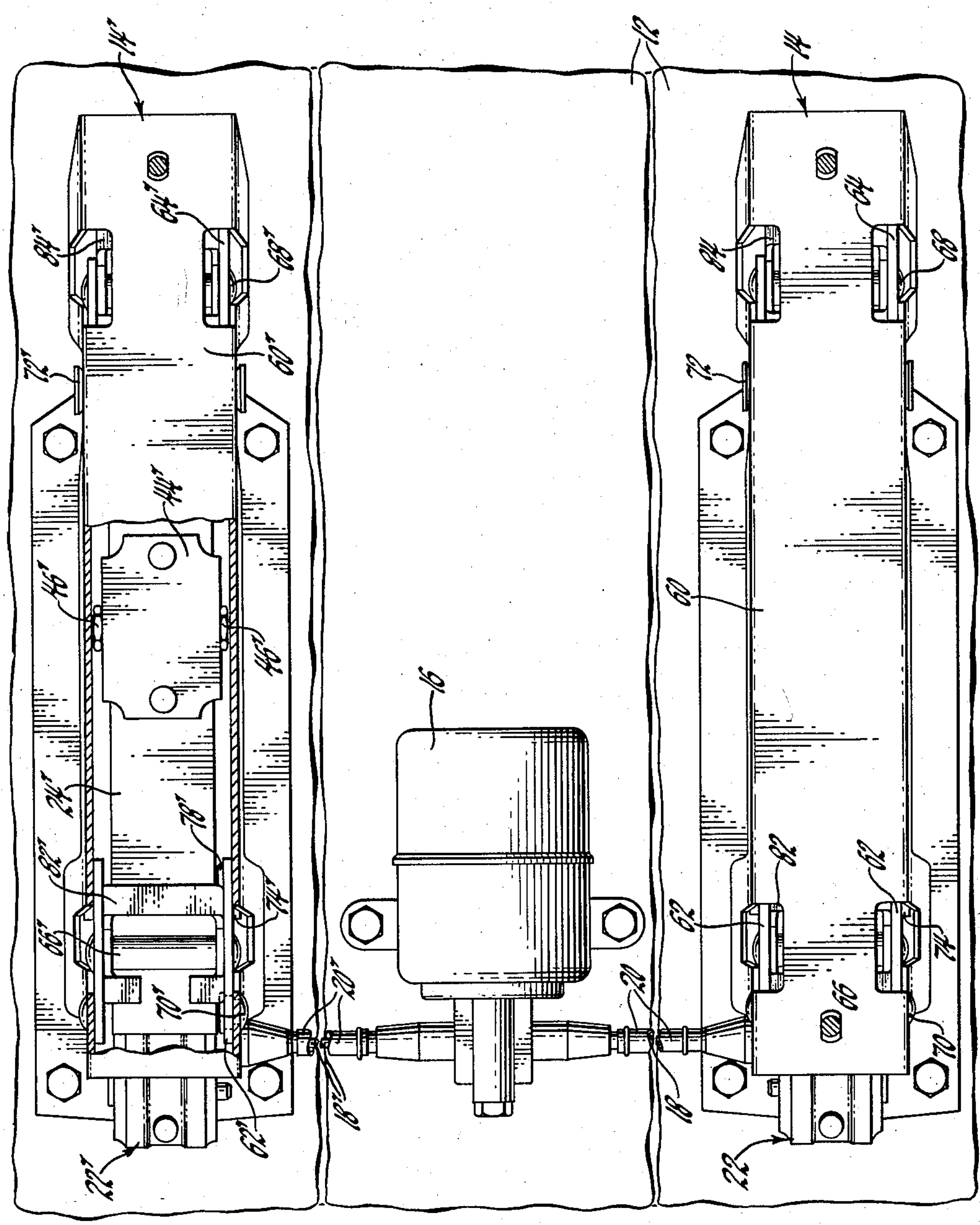

In the drawings:

Figure 1 is a side elevation, partially broken away, of the left-hand seat adjuster, Figure 2 is a plan view, taken on the plane indicated by the line 2—2 of Figure 1 and partially broken away, of the entire seat adjuster, Figure 3 is a horizontal section of the left-hand seat adjuster taken on the plane indicated by the line 3—3 of Figure 1, Figure 4 is a vertical section of the left-hand seat adjuster taken on the plane indicated by the line 4—4 of Figure 1, Figure 5 is a vertical section of the left-hand seat adjuster taken on the plane indicated by the line 5—5 of Figure 1, Figure 6 is a vertical section of the left-hand seat adjuster taken on the plane indicated by line 6—6 of Figure 1, and Figure 7 is a schematic drawing of the control circuit for the seat adjuster.

Referring to the drawings, a vehicle seat 10 is adjustably supported on the floor pan 12 by left and right seat adjusters 14 and 14'. Since the seat adjusters are similar, detailed separated descriptions are not made and primed reference characters indicate the right seat adjuster. A reversible electric motor 16 powers the seat adjusters 14 and 14' by way of flexible cables 18 and 18' which are enclosed in protective conduits 20 and 20'.

The support means for the seat adjuster 14 includes a lower track 22 which slidably supports an upper track 24 for fore and aft horizontal movement. The tracks 22 and 24 have the usual interlocked channel portions with ball and roller bearings 26 and 28 and may have a slight curvature in the vertical plane to provide some tilting of the seat with fore and aft movement.

A transmission 30 is mounted in the lower track support 22 by a pivot pin 32 and has a bevel gear 34 drivingly connected to the cable 18 and engaging a bevel gear 36 that drives a jackscrew 38 which is mounted by a bearing sleeve 40 and thrust bearings 43. The jackscrews 38 and 38' rotate in counterclockwise or clockwise direction depending upon the direction of rotation of the electric motor 16.

A clutch nut assembly 42 is mounted on the jackscrew 38 and is pivotally connected to an upper track bracket 44 by pivot pins 46 which extend through longitudinal slots 48 in the side walls of the lower track 22. As may be seen in Figure 5, enough clearance is provided between the pivot pins 46 and bracket 44 to allow the bracket 44 to follow the slight curvature of the tracks 22 and 24. The clutch nut assembly 42 includes a casing 50 that carries the pivot pins 46 and a nut 52 that is threaded on the jackscrew 38. The nut 52 rotates with the jackscrew 38 due to thread friction and a solenoid 54 having an armature 56 is mounted on the casing 50 to clutch the nut 52 to the casing 50 and stop it from rotating when desired. The armature 56 engages a cavity 58 in the peripheral surface of the nut 52 when the solenoid 54 is energized.

When the jackscrew 38 is rotating and the solenoid 54 is deenergized, the nut 52 will freewheel whereupon the clutch nut assembly 42 will remain stationary in the lower track slots 48 and the associated upper track 24 will also remain stationary. With the jackscrew 38 rotating and the solenoid 54 energized to stop the nut 52 from rotation, the clutch nut assembly 42 is advanced along the jackscrew carrying with it the upper track 24 and seat 10. The seat adjuster 14 is shown in the downward and rearward position and clockwise rotation effects forward adjustment while counterclockwise rotation effects rearward adjustment. The upper track 24 and seat 10 may be stopped at a desired fore and aft position by deenergizing the clutch nut 42. The pivot connections for the transmission and clutch nut at 32 and 46 are required because the seat tracks are curved in a vertical plane and these pivot connections can be dispensed with if a straight track is utilized.

The seat 10 mounts on a supporting platform 60 which is carried on the upper track 24 by front and rear bell cranks 62 and 64. The front bell cranks 62 are pivotally secured to the upper track 24 by a pivot pin 66 while the rear bell cranks 64 are pivotally secured to the upper track by a pivot pin 68. The forward depending ends of the bell cranks 62 and 64 connect to the platform 60 by pivot pins 70 and 72 and the rearward depending ends of the bell cranks connect to links 74 and 76 through pivot pins 78 and 80. Brackets 82 and 84 secure the pivot pins 66 and 68 to the upper track 24.

The jackscrew 38 also has a nut 86 threaded thereto and the nut 86 has pivot pins 88 which extend through the slots 48 in the lower track 22 to restrain the nut from rotation with the jackscrew. The links 74 and 76 are pivotally connected on the pivot pins 88 and it is readily seen that rotation of the jackscrew 38 will advance the nut 86 and associated links 74 and 76. Unlike the clutch nut 42, the nut 86 will advance on the jackscrew whenever the jackscrew is rotated. If the clutch nut 42 is deenergized, clockwise rotation of the jackscrew 38 will swing the bell cranks 62 and 64 in clockwise direction through the links 74 and 76 thus raising the platform 60 and seat 10 while counterclockwise rotation will lower the seat which can be stopped in a desired vertical position by stopping the motor 16.

It will be noted that the seat adjuster will not adjust vertically whenever the clutch nut 42 is energized for in this condition the clutch nut 42 moves the upper track 24 and pivot pins 66 and 68 horizontally at the same rate that the bell cranks 62 and 64 and the links 74 and 76 are being moved by the nut 86. In other words, the pivot pins 66 and 68 must be stationary with respect to the nut 86 in order to raise or lower the seat platform 60.

A U-shaped bracket 90 is slidably mounted within the lower track support 22 and has slots 92 in the legs thereof that align with the slots 48. The open end of the bracket 90 is pivotally connected to the pivot pins 46 of the clutch nut 42 so that the bracket 90 will go back and forth along the jackscrew with the clutch nut 42. The pivot pins 88 of the nut 86 are not rigidly secured to the bracket 90 but are instead able to slide back and forth in the slots 92. The seat adjuster is shown in the down and rear position and it is seen that the nut 86 can move forwardly along the jackscrew 38 without disturbing the bracket 90 to raise the seat, the clutch nut 42 being deenergized during this time. It is also seen that if the clutch nut 42 is energized, it will move forwardly to shift the seat forwardly and will take with it the bracket 90 which will, however, not disturb the nut 86 as the nut 86 is also moving forwardly due to the rotation of the jackscrew. The seat will not raise during this condition for, as previously explained, the vertical linkage has no fixed pivots to work against during horizontal adjustment of the upper track. The bracket 90 insures proper positioning of the nuts 42 and 86 by limiting the relative movement between the nuts to the length of the slots 92 and consequently any tendency of the clutch nut 42 to creep is automatically corrected.

Although the lower track 22 is secured to the floor in the shown embodiment, it should be realized that the seat adjuster can be inverted and the platform 60 secured to the floor instead.

The control circuit for the seat adjuster is quite simple. A manually operable selector switch arm 94 connects a battery 96 to the forward drive winding of the motor 16 when in positions F or U and connects the battery to the reverse drive winding of the motor when in positions R or D. Another switch arm 97 is operated with the switch arm 94 to energize the solenoids 54 and 54′ when the switch is in R or F positions. When the selector switch is put in R position, the clutch nuts 42 and 42′ are energized and the jackscrews 38 and 38′ are driven counterclockwise to move the seat rearwardly through the clutch nuts. When the selector switch is put in F position, the clutch nuts are energized and the jackscrews are driven clockwise to move the seat forwardly through the clutch nuts. When the selector switch is put in D position, the clutch nuts are deenergized and the jackscrews are driven counterclockwise to move the seat downwardly through the nuts 86 and 86′. When the selector switch is put in U position, the clutch nuts are deenergized and the jackscrews are driven clockwise to move the seat upwardly through the nuts 86 and 86′.

While the embodiment of the invention here described is preferred other embodiments may be made within the scope of the invention.

I claim:

1. A seat adjuster comprising first and second support means, a first track means secured to the first support means, a second track means secured to the first track means for movement relative thereto in fore and aft directions, linkage means securing the second support means to the second track means for movement therewith in fore and aft directions and relative thereto in up and down directions, the second support means being thus movable relative the first support means in fore and aft directions through the track and linkage means and in up and down directions through the linkage means, a rotatable jackscrew carried by the first support means, means for rotating the jackscrew at will in clockwise and counterclockwise directions, a first nut on the jackscrew connected with the second track means and including clutch means operable when engaged to restrain the nut from rotation with the jackscrew, means for operating the clutch means at will whereby the jackscrew when rotating with the clutch means engaged will move the second support means relative the first support means in fore and aft directions through the track and linkage means, and a second nut on the jackscrew and connected with the linkage means whereby the nut is restrained from rotation with the jackscrew and the jackscrew when rotating with the clutch means disengaged will move the second support means relative the first support means in up and down directions through the linkage means.

2. A seat adjuster comprising first and second support means, a first track means secured to the first support means, a second track means secured to the first track means for movement relative thereto in fore and aft directions, linkage means securing the second support means to the second track means for movement therewith in fore and aft directions and relative thereto in up and down directions, the second support means being thus movable relative the first support means in fore and aft directions through the track and linkage means and in up and down directions through the linkage means, a rotatable jackscrew carried by the first support means, an electric motor for rotating the jackscrew at will in clockwise and counterclockwise directions, a first nut on the jackscrew connected with the second track means and including clutch means operable when engaged to restrain the nut from rotation with the jackscrew, a solenoid for operating the clutch means at will whereby the jackscrew when rotating with the clutch means engaged will move the second support means relative the first support means in fore and aft directions through the track and linkage means, and a second nut on the jackscrew and connected with the linkage means whereby the nut is restrained from rotation with the jackscrew and the jackscrew when rotating with the clutch means disengaged will move the second support means relative the first support means in up and down directions through the linkage means.

3. A seat adjuster comprising first and second support means, a first track means secured to the first support means, a second track means secured to the first track means for movement relative thereto in fore and aft directions, linkage means securing the second support means to the second track means for movement therewith in fore and aft directions and relative thereto in up and down directions, the second support means being thus movable relative the first support means in fore and aft directions through the track and linkage means and in up and down directions through the linkage means, a rotatable jackscrew carried by the first support means, means for rotating the jackscrew at will in clockwise and counterclockwise directions, a first nut on the jackscrew connected with the second track means and including clutch means operable when engaged to restrain the nut from rotation with the jackscrew, means for operating the clutch means at will whereby the jackscrew when rotating with the clutch means engaged will move the second support means relative the first support means in fore and aft directions through the track and linkage means, a second nut on the jackscrew and connected with the linkage means whereby the nut is restrained from rotation with the jackscrew and the jackscrew when rotating with the clutch means disengaged will move the second support means relative the first support means in up and down directions through the linkage means, and a link connected to the one nut and having a lost motion connection with the other nut.

4. A seat adjuster comprising first and second support means, a first track means secured to the first support means, a second track means secured to the first track means for movement relative thereto in fore and aft directions, linkage means securing the second support means to the second track means for movement therewith in fore and aft directions and relative thereto in up and down directions, the second support means being thus movable relative the first support means in fore and aft directions through the track and linkage means and in up and down directions through the linkage means, a rotatable jackscrew carried by the first support means, an electric motor for rotating the jackscrew at will in clockwise and counterclockwise direction, a first nut on the jackscrew connected with the second track means and including clutch means operable when engaged to restrain the nut from rotation with the jackscrew, a solenoid for operating the clutch means at will whereby the jackscrew when rotating with the clutch means engaged will move the second support means relative the first support means in fore and aft directions through the track and linkage means, a second nut on the jackscrew and connected with the linkage means whereby the nut is restrained from rotation with the jackscrew and the jackscrew when rotating with the clutch means disengaged will move the second support means relative the first support means in up and down directions through the linkage means, and a link connected to the first nut and having a lost motion connection with the second nut.

5. A seat adjuster comprising first support means adapted to be secured to a vehicle floor, second support means adapted to be secured to a vehicle seat, a first track means secured to the first support means, a second track means secured to the first track means for movement relative thereto in fore and aft directions, the track means being curved in the vertical plane, bell crank linkage means securing the second support means to the second track means for movement therewith in fore and aft directions and relative thereto in up and down directions, the second support means being thus movable relative the first support means in fore and aft directions through the track and linkage means and in up and down directions through the linkage means, a rotatable jackscrew having a pivot connection to first support means, an electric motor for rotating the jackscrew at will in clockwise and counterclockwise directions, a first nut on the jackscrew having a pivot connection with the second track means and including clutch means operable when engaged to restrain the nut from rotation with the jackscrew, a solenoid for operating the clutch means at will whereby the jackscrew when rotating with the clutch means engaged will move the second support means relative the first support means in fore and aft directions through the track and linkage means, a second nut on the jackscrew and having a pivot connection with the linkage means whereby the nut is restrained from rotation with the jackscrew and the jackscrew when rotating with the clutch means disengaged will move the second support means relative the first support means in up and down directions through the linkage means, and a link pivotally connected to the first nut and having lost motion connection with the second nut.

References Cited in the file of this patent

UNITED STATES PATENTS

| | | |
|---|---|---|
| 2,345,182 | Corber | Mar. 28, 1944 |
| 2,809,688 | Brundage | Oct. 15, 1957 |